United States Patent [19]
Eto et al.

[11] Patent Number: 5,848,472
[45] Date of Patent: Dec. 15, 1998

[54] ROTATABLE CIRCULAR SAW WITH PARALLELISM ADJUSTMENT FUNCTION

[75] Inventors: Naoya Eto; Hiroshi Sato; Takuma Nonaka; Kenji Niwa, all of Hitachinaka, Japan

[73] Assignee: Hitachi Koki Co., Ltd., Japan

[21] Appl. No.: 736,737

[22] Filed: Oct. 25, 1996

[30] Foreign Application Priority Data

Oct. 27, 1995 [JP] Japan ................................ 7-280067
May 10, 1996 [JP] Japan ................................ 8-116411

[51] Int. Cl.⁶ .......................... B27B 9/00; B23D 45/16
[52] U.S. Cl. ................................. 30/375; 30/390
[58] Field of Search ........................... 30/375, 388, 389, 30/390, 391, 376

[56] References Cited

U.S. PATENT DOCUMENTS

| | | | |
|---|---|---|---|
| 2,986,178 | 5/1961 | Cranmore | 30/375 |
| 3,242,953 | 3/1966 | McCarty et al. | 30/375 |
| 4,516,324 | 5/1985 | Heininger, Jr. et al. | 30/391 X |
| 4,856,394 | 8/1989 | Clowers | 30/390 X |
| 4,982,501 | 1/1991 | Sauerwein et al. | 30/376 |
| 5,414,935 | 5/1995 | Braunbach et al. | 30/390 X |

FOREIGN PATENT DOCUMENTS 3601405  7/1987  Germany ............................... 30/390

*Primary Examiner*—Eugenia A. Jones
*Attorney, Agent, or Firm*—Rossi & Associates

[57] ABSTRACT

A portable circular saw is disclosed which includes a mechanism for simply and efficiently adjusting parallelism of the saw blade to the base. Two connecting members positioned at the front and rear of the saw connect the base of the saw to the saw cover, and the mechanism for adjusting parallelism is part of the front connecting member.

3 Claims, 5 Drawing Sheets

ROTATABLE CIRCULAR SAW WITH PARALLELISM ADJUSTMENT FUNCTION

BACKGROUND OF THE INVENTION

1. Field of the Invention

The present invention relates to a portable circular saw, by which it is possible to achieve fine adjustment of parallelism of a saw blade to a lateral side of a base.

2. Description of the Related Art

FIGS. 4 to 6 each represent an example of a conventional type portable circular saw. As shown in FIGS. 4 and 5, the conventional type portable circular saw comprises a saw blade 2 driven by an electric motor, a saw cover (or saw guard) 1 to cover the saw blade 2, and a base (or shoe plate) 3 mounted on the saw cover 1 and used for determining depth of cut and for providing a reference for the cutting operation.

In the conventional type portable circular saw, the base 3 is mounted on the saw cover 1 via a first connecting means 10 and a second connecting means 11 as shown in FIG. 5. The first connecting means 10 is positioned in front of a main unit of the saw (in advancing or moving direction of the circular saw) and connects the base 3 with the saw cover 1 by a roll pin 12 in such manner that the base 3 can be rotated around the first connecting means 10 as shown in FIG. 5. In FIGS. 4 and 5, an arrow G indicates advancing direction of the circular saw. The second connecting means 11 is positioned on the base 3 on a rear portion of the main unit and is mounted on the saw cover 1 by a fastening bolt 13 as shown in FIG. 5. It connects a link 4 that is movable downwardly under the main unit to a certain extent and the base 3 by means of a rivet 14.

By loosening the bolt 13 and by moving the second connecting means 11 downward as the engagement with the link 4 is loosened, the base 3 is rotated around the first connecting member 10 as shown by two-dot chain line in FIG. 5. By this operation, the depth of cut can be adjusted.

In the conventional type portable circular saw as described above, when accurate cutting must be performed using a lateral side (hereinafter referred to as "base side") 15, of the base 3, parallelism of the saw blade 2 to the base side 15 is important. Because this parallelism is determined by dimensional accuracy of assembled parts, the conventional type saw has disadvantages in that there occurs slight variation in this parallelism.

To overcome such disadvantages, a shoe plate aligning means for a portable power-driven saw is disclosed in U.S. Pat. No. 3,242,953. In the circular saw disclosed in this U.S. Patent, an adjusting screw is arranged on a portion, which corresponds to the second connecting member as described in the above conventional example, and this screw is used for fine adjustment of the parallelism.

In this arrangement, however, it is difficult to perform the adjustment by the screw in the following points:

(1) In case the main unit of the saw is tilted with respect to the advancing direction, i.e. to a longitudinal axis of the base, the head of the adjusting screw is brought too close to the base. As a result, it is difficult to apply a screwdriver to the screw head, and adjustment cannot be achieved.

(2) The adjusting screw is positioned on a rear portion of and to the right of a grip or a handle, by which the main unit is held manually. When a right-handed operator holds the handle by right hand, the adjusting screw positioned at right of the handle must be operated by the left hand of the operator, and this is practically impossible. For this reason, the right hand must be separated from the handle when operating.

(3) When the operator operates the saw by holding the handle by right hand, the operator watches the position where tip of the saw blade in advancing direction engages with the workpiece. Therefore, if the operator operates the adjusting screw, which is positioned at rear position in the advancing direction shown by the arrow G, the operator must watch in front and rear directions at the same time, and this decreases working efficiency.

SUMMARY OF THE INVENTION

It is an object of the present invention to provide a portable circular saw with a parallelism adjustment function, by which it is possible to eliminate slight variation of parallelism of the saw blade to the base side by simple operation and with high working efficiency.

The above object is attained by designing the circular saw in such manner that, of the two connecting members of the saw cover connected with the base, the connecting member positioned at the front end of the saw with respect to the advancing direction of the saw is movable to establish parallelism between the base and the saw blade.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
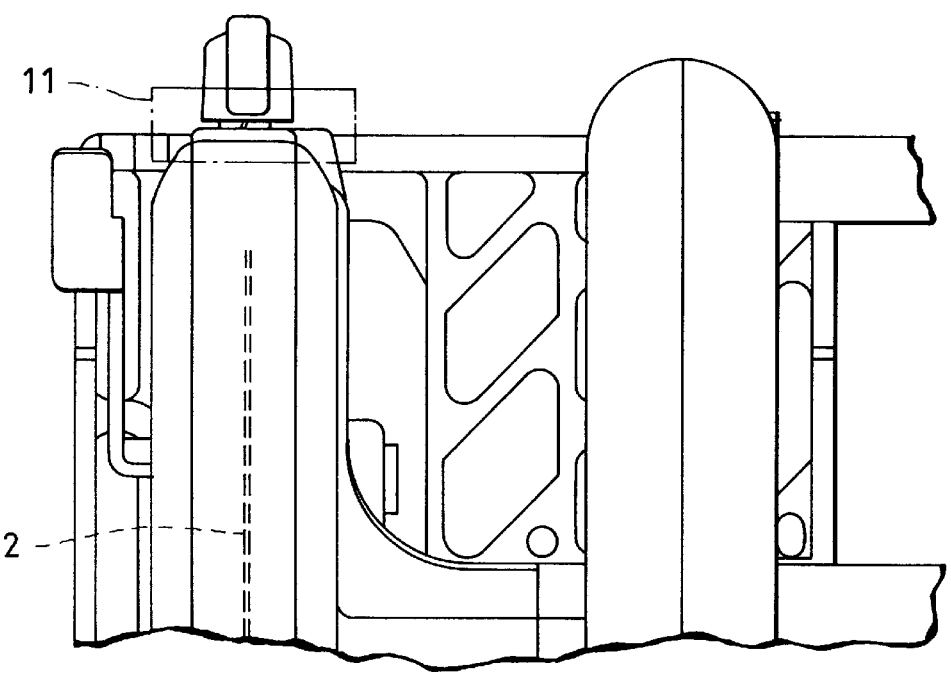
FIG. 1 is a top cross-sectional view of an essential portion of an embodiment of a portable circular saw according to the present invention.
Figure 1:
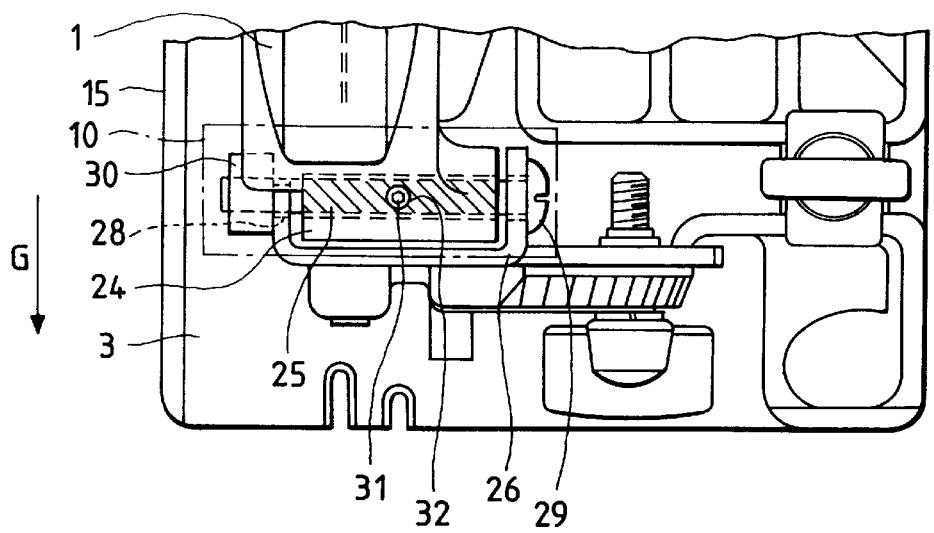
Figure 2:
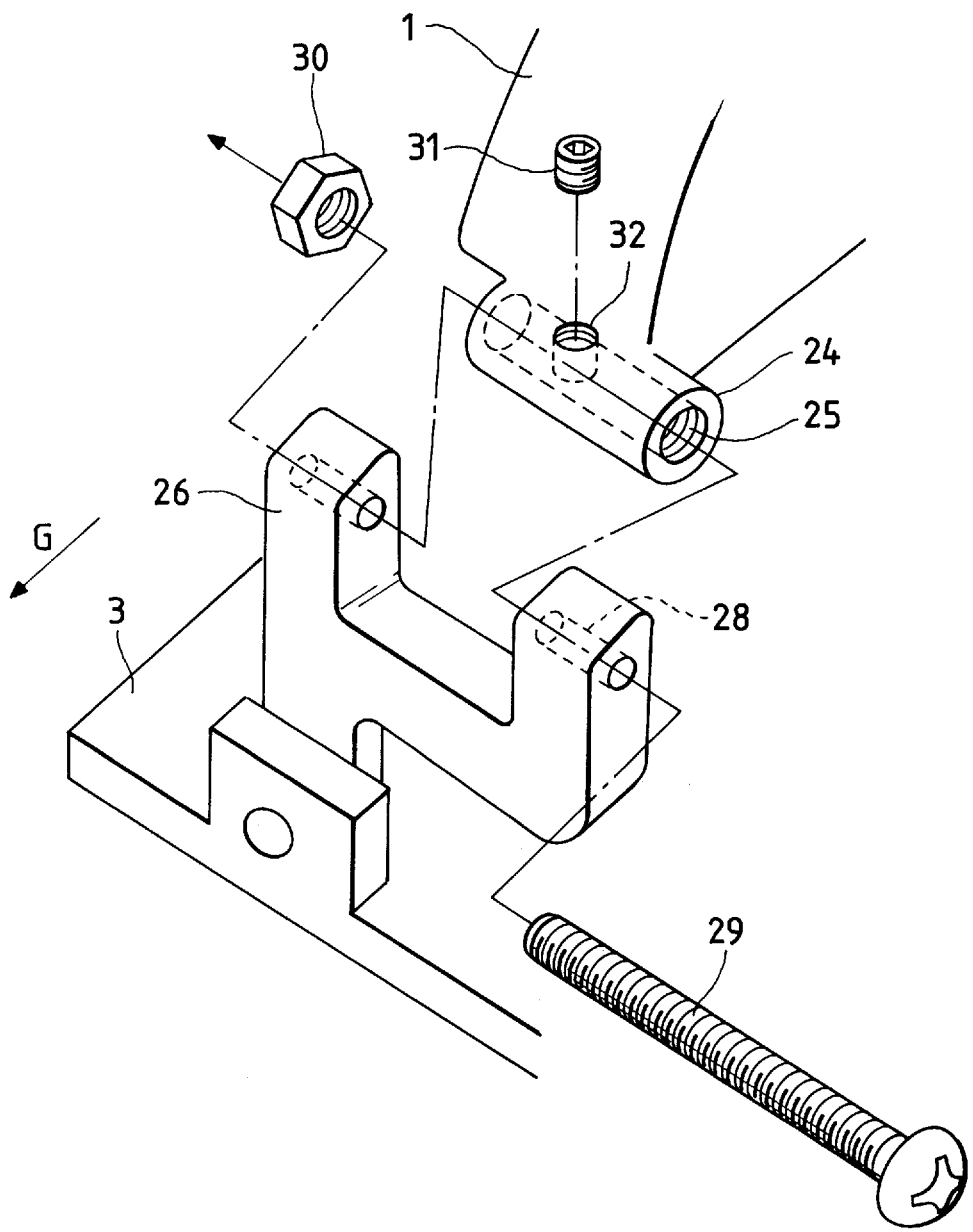
FIG. 2 is an exploded perspective view of an essential portion of the circular saw of FIG. 1.
Figure 3:
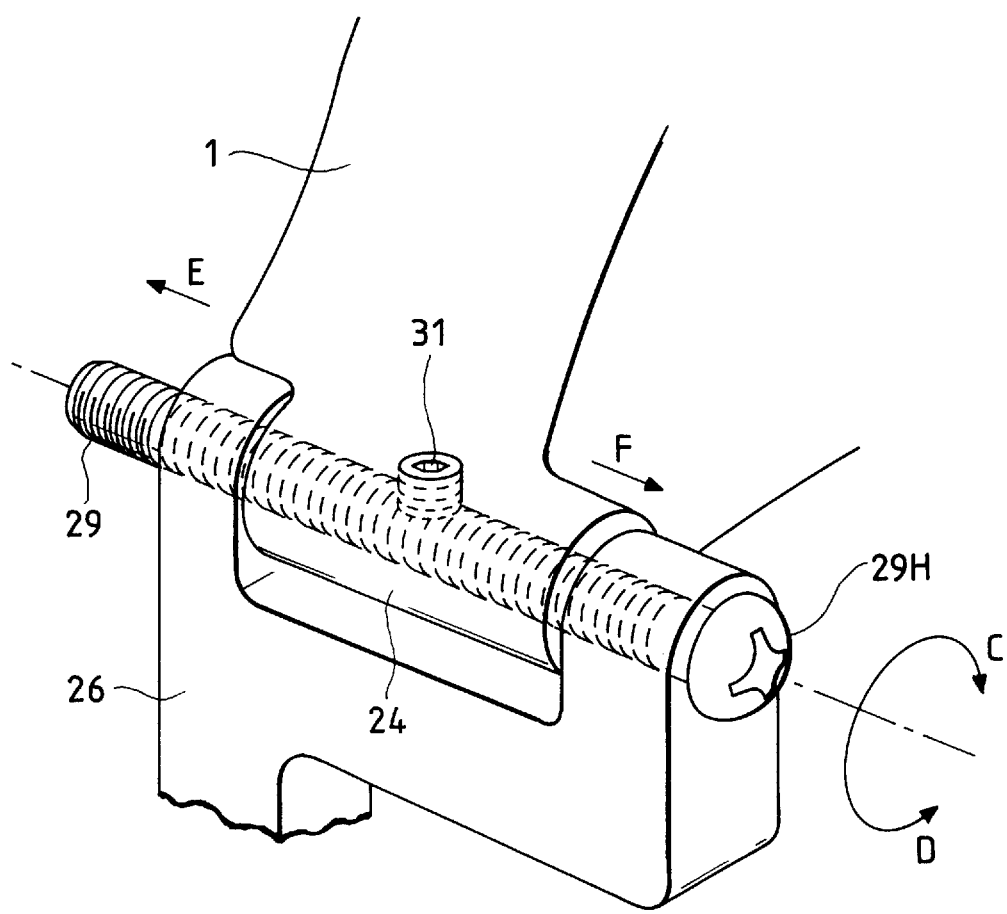
FIG. 3 is an enlarged perspective view of an essential portion of the circular saw of FIG. 1.
Figure 4:
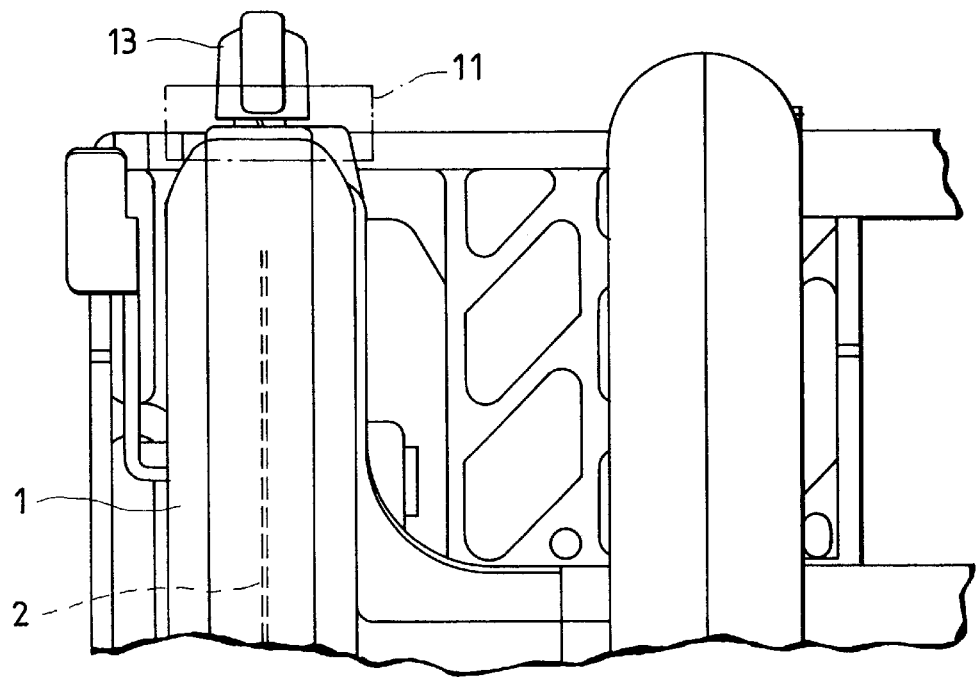
FIG. 4 is a top cross-sectional view of an example of a conventional type portable circular saw.
Figure 4:
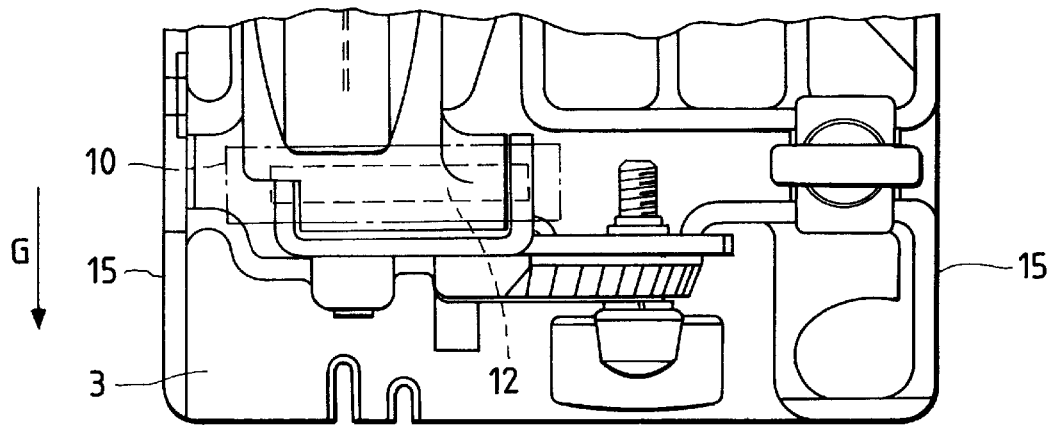
Figure 5:
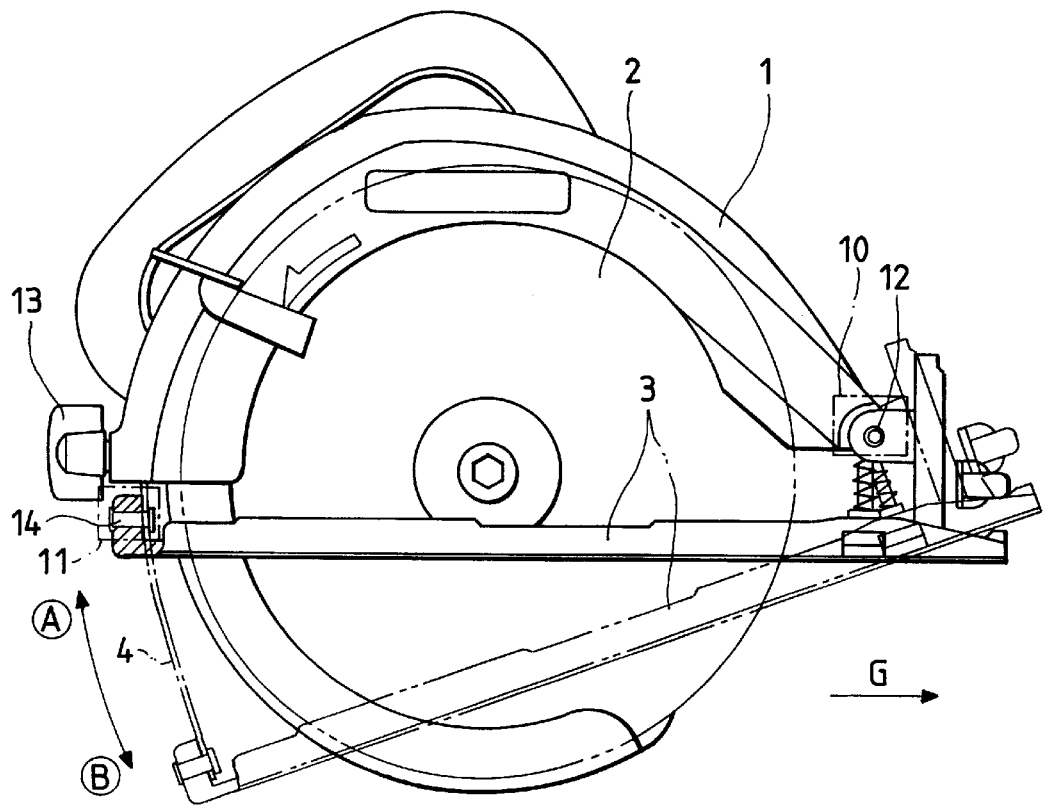
FIG. 5 is a side view of the circular saw of FIG. 4.
Figure 6:
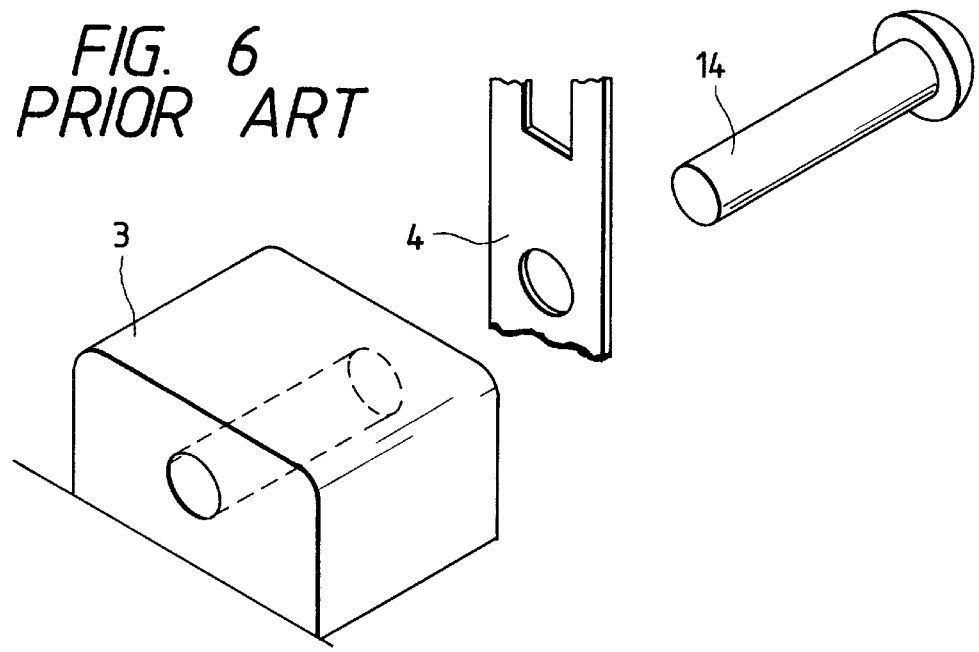
FIG. 6 is an exploded perspective view of an essential portion of the circular saw of FIG. 4.

FIGS. 1 to 3 each represents an embodiment of a portable circular saw according to the present invention. As shown in the figures, of two connecting means 10 and 11 for connecting a saw cover 1 with a base 3, structure of the connecting means 10 is modified, which is positioned at the front end of the saw with respect to the advancing direction of the portable circular saw. The structure of the circular saw is the same as the portable circular saw shown in FIGS. 4 to 6 except for the structure of the front connecting member 10. In FIGS. 1 and 2, the above advancing direction is indicated by an arrow G.

As shown in FIG. 1, the saw cover 1 is provided with a hinge 24 having a female screw 25, and a hinge holder 26 having two holes 28 positioned on the same line as the female screw 25 is arranged on the base 3. As shown in FIG. 2, the saw cover 1 and the base 3 are connected with each other by an adjusting screw 29, which is inserted and engaged with the female screw 25 of the hinge 24 via the holes 28 of the hinge holder 26. After the adjusting screw 29 is inserted into the hinge holder 26, a stop member 30 is mounted on the adjusting screw 29. Also, as shown in FIGS. 2 and 3, the hinge 24 is provided with a screw hole 32, which runs perpendicularly to axial direction of the female screw 25, and a presser screw 31 is inserted into the screw hole 32.

In the arrangement as described above, the base 3 can be rotated around the first connecting means 10, and when the adjusting screw 29 is rotated in directions C or D as shown in FIG. 3, the hinge 24 can be moved in directions E or F.

The variation of parallelism of the saw blade 2 to the base side 15 can be eliminated by rotating the adjusting screw 29. By tightening the presser screw 31, the adjusting screw 29 can be fixed at any position as desired. With the handle of the main unit (See left upper portion of FIG. 5.) held by the right hand, the operator can hold a screwdriver in the left hand and easily adjust the adjusting screw 29. In this case, it is preferable that a screw head 29H of the adjusting screw 29 is positioned to the left of the handle when viewed from an operator's perspective as shown in FIG. 3 because this is convenient to increase maneuverability.

It is possible according to the present invention to provide a portable circular saw, which can cut at high accuracy when cutting is achieved utilizing the base side because fine adjustment of parallelism of the saw blade to the base side can be achieved by a simple operation and with high working efficiency.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A portable circular saw, comprising:
   a saw blade driven by an electric motor;
   a saw cover to cover said saw blade;
   a base mounted on said cover and used to determine depth of cut and to provide a reference when cutting a workpiece; and
   means for connecting said saw cover to said base comprising a first connecting means positioned at a front of said saw and a second connecting means positioned at a rear of said saw, wherein said first connecting means is upstream of said saw blade in an advancing direction of said saw when cutting a workpiece;
   wherein said first connecting means comprises means for adjusting parallelism of said saw blade to said base;
   wherein said first connecting means comprises a hinge having a female screw mounted on said saw cover, a hinge holder mounted on said base and having at least two holes aligned with the longitudinal axis of the female screw of said hinge, an adjusting screw inserted into the female screw of said hinge and into the holes of said hinge holder for adjusting parallelism of said saw blade and said base, and a stop member mounted on a tip of said adjusting screw; and
   wherein the holes of said hinge holder are spaced apart and the female screw is received between the holes.

2. A portable circular saw according to claim 1, wherein said hinge is provided with a screw hole running perpendicularly to the longitudinal axis of the female screw, and a presser screw inserted into said screw hole.

3. A portable circular saw according to claim 1, wherein a screw head of said adjusting screw is positioned to the left of said hinge as viewed from an operator's perspective.

\* \* \* \* \*